(12) United States Patent
Ahn et al.

(10) Patent No.: US 7,952,867 B2
(45) Date of Patent: May 31, 2011

(54) PORTABLE TERMINAL HAVING LONG STROKE HINGE

(75) Inventors: Sung Ho Ahn, Suwon-si (KR); Sang Mook Kim, Gumi-si (KR); Seok Gyu Lee, Yongin-si (KR); Chang Su Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 12/190,315

(22) Filed: Aug. 12, 2008

(65) Prior Publication Data

US 2009/0109614 A1    Apr. 30, 2009

(30) Foreign Application Priority Data

Oct. 31, 2007    (KR) .................. 10-2007-0109995

(51) Int. Cl.
  *G06F 1/16*    (2006.01)

(52) U.S. Cl. ........... 361/679.56; 361/679.01; 361/679.3; 361/679.57; 455/575.4; 379/433.13

(58) Field of Classification Search .............. 361/679.56
See application file for complete search history.

(56) References Cited

U.S. PATENT DOCUMENTS

| 2006/0178176 A1* | 8/2006 | Kwak et al. ................ 455/575.4 |
| 2007/0155451 A1* | 7/2007 | Lee .............................. 455/575.4 |
| 2008/0099969 A1* | 5/2008 | Kim et al. .................... 267/167 |

* cited by examiner

*Primary Examiner* — Jayprakash N Gandhi
*Assistant Examiner* — Anthony Q Edwards
(74) *Attorney, Agent, or Firm* — H.C. Park & Associates, PLC

(57) ABSTRACT

A portable terminal having a long-stroke hinge is disclosed. The portable terminal includes a first main body, a second main body sliding on the first main body, a first member with elasticity having a first end fixed to the first main body and a second end that is horizontally moveable, and a second member having a first end rotatably coupled with the second end of the first member and a second end fixed to the second main body.

12 Claims, 7 Drawing Sheets

PORTABLE TERMINAL HAVING LONG STROKE HINGE

CROSS REFERENCE TO RELATED APPLICATION

This application claims priority from and the benefit of Korean Application No. 10-2007-0109995, filed on Oct. 31, 2007, which is hereby incorporated herein by reference for all purposes as if fully set forth herein.

BACKGROUND OF THE INVENTION

1. Field of the Invention

The present invention relates generally to a portable terminal having a long stroke hinge and, more particularly, to a slide type portable terminal having a long stroke hinge that may be advantageous in securing a space to drive a hinge.

2. Discussion of the Background

In general, a portable terminal may be classified as a bar type portable terminal, a flip type portable terminal, a folder type portable terminal, or a slide type portable terminal.

In the bar type portable terminal, a key pad to input data, a display to output the data, and a transmitter and receiver module are installed in a single main body housing. Thus, the bar type portable terminal may have a simple structure.

The flip type portable terminal includes a main body and a hinge pivotally connecting a flip to the main body. The main body of the flip type portable terminal is identical to that of the bar type portable terminal, and the flip covers a key pad in a standby mode to prevent malfunction of the key pad.

The folder type portable terminal includes a main body, a folder, and a hinge pivotally connecting the folder to the main body such that the folder pivots about the main body to open the main body. In a standby mode when the folder contacts the main body, the folder covers a key pad to prevent malfunction of the key pad, and to make or receive a call, the folder is open and a distance between a transmitter and a receiver is sufficiently secured so that the folder type terminal may be small.

The slide type portable terminal is configured such that a slider slides up and down along a main body to open and close the main body and to perform various functions. For example, a user can turn on a display installed in a front side of the slider and/or receive a call by sliding the slider up to open the main body. Also, the user can press a desired key of a plurality of keys that are installed in the front side of the main body by sliding up the slider.

The slide type portable terminal includes a hinge capable of sliding the slider along the main body. Recently, in the slide type portable terminal, the size of the display provided in the slider has increased and thus function keys such as navigation keys that have been provided in the slider are arranged in the main body.

Thus, a stroke of the slider should also increase such that all of the keys provided in the main body can be revealed when the slider slides up. As such, there is a demand for a hinge corresponding to the long stroke, which will allow the main body to be arranged flat on the hinge and secure a space for a flexible printed circuit board (FPCB).

SUMMARY OF THE INVENTION

The present invention provides a portable terminal having a long-stroke hinge suitable for a long stroke.

The present invention also provides a portable terminal having a long-stroke hinge that allows a main body to be arranged flat thereon, secures space for a flexible printed circuit board, and has an improved spring lifetime.

The present invention also provides a portable terminal having a long-stroke hinge in which a space for the long stroke hinge may be minimized using two springs.

Additional features of the invention will be set forth in the description which follows, and in part will be apparent from the description, or may be learned by practice of the invention.

The present invention discloses a portable terminal including a first main body, a second main body sliding on the first main body, a first member with elasticity having a first end fixed to the first main body and a second end horizontally moving, and a second member having a first end rotatably coupled with the second end of the first member and a second end fixed to the second main body.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
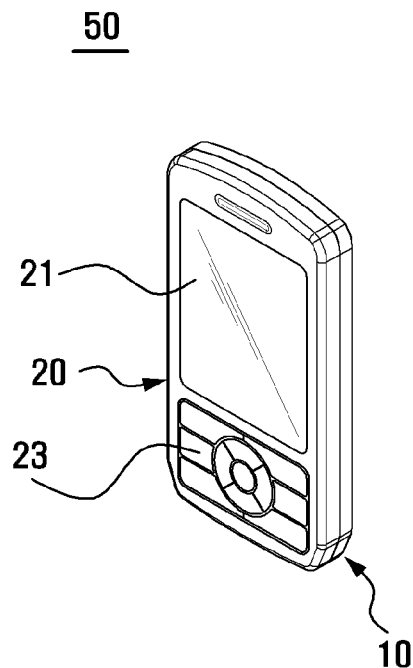
FIG. 1A and FIG. 1B are perspective views schematically showing the opening and closing of a general slide type portable terminal.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 1B:
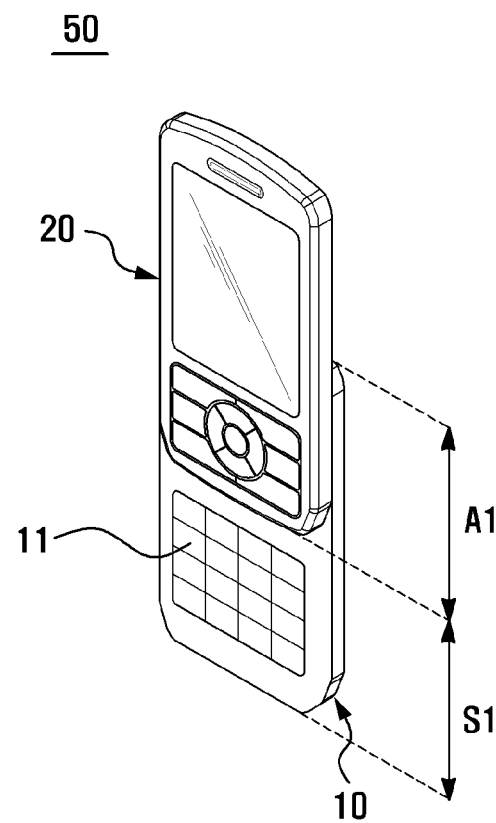

FIG. 1A and FIG. 1B are perspective views schematically showing the opening and closing of a general slide type portable terminal.

Referring to FIG. 1A and FIG. 1B, a general slide type portable terminal 50 includes a first main body 10 and a second main body 20. The second main body 20 slides on the first main body 10. Reference numeral S1 of FIG. 1B indicates a stroke as a distance in which the second main body 20 slides and reference numeral A1 indicates a region where a hinge (not shown) allows the second main body 20 to slide on the first main body 10.

The first main body 10 includes a key input unit 11 to allow a user to input numbers or text to the slide type portable terminal 50. The second main body 20 includes a display 21 to display the operation status of the slide type portable terminal 50. The second main body 20 includes function keys 23 provided below the display 21 to perform several functions, such as a navigation function.

Figure 2A:
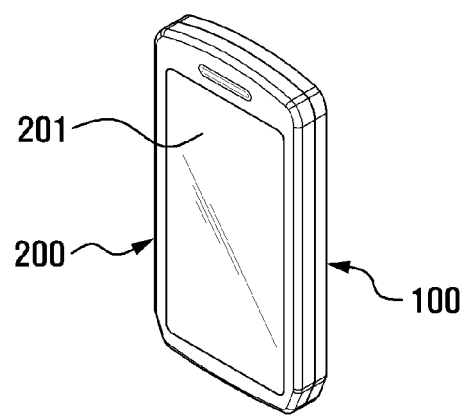
FIG. 2A and FIG. 2B are perspective views showing the opening and closing of a portable terminal having a long-stroke hinge according to an exemplary embodiment of the present invention.
Figure 2B:
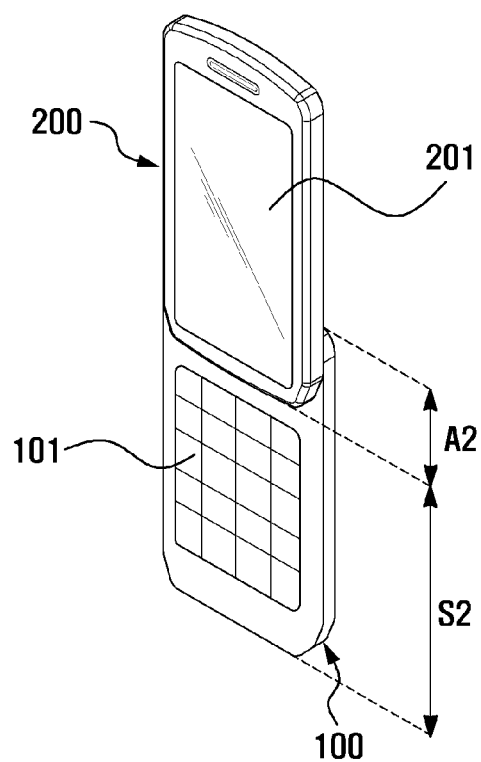

Hereinafter, a portable terminal according to an exemplary embodiment of the present invention will be described. FIG. 2A and FIG. 2B are perspective views showing the opening and closing of a portable terminal having a long-stroke hinge according to an exemplary embodiment of the present invention.

Referring to FIG. 2A and FIG. 2B, a slide type portable terminal 500 according to an exemplary embodiment of the present invention includes a first main body 100 and a second main body 200. The second main body 200 slides on the first main body 100.

The first main body 100 includes a key input unit 101 to allow a user to input numbers or text to the portable terminal 500. The key input unit 101 includes the same function keys as those of the second main body in FIG. 1A. In other words, the key input unit 101 provided in the first main body 100 includes number and letter keys and function keys. Although the key input unit 11 provided in the first main body 10 of the above-mentioned portable terminal 50 may occupy a width about 30 to 40 mm in the longitudinal direction of the portable terminal 50, the key input unit 101 provided in the first main body 100 of the portable terminal 500 according to this exemplary embodiment of the present invention may have a width greater than 50 mm.

The second main body 200 includes a display 201 to display the operation status of the portable terminal 500.

Reference numeral S2 of FIG. 2B indicates a stroke, which is the distance that the second main body 200 slides, and reference numeral A2 indicates a region where a hinge such as a long-stroke hinge 300 or 400 allows the second main body 200 to slide on the first main body 100. The second main body 200 of the portable terminal according to the exemplary embodiment of the present invention includes a larger display 201 than the second main body 20 of the general portable terminal 50, and the first main body 100 includes the key input unit 101 having more keys than those provided in the first main body 10 of the general portable terminal 50.

When the second main body 200 of the portable terminal 500 fully slides, all of the key input unit 101 of the first main body 100 should be revealed. Thus, the portable terminal 500 should have a stroke longer than the general portable terminal 50. The stroke S2 of the portable terminal 500 in FIG. 2B is longer than the stroke S1 of the portable terminal 50 in FIG. 1B (S2>S1). The region where the hinge is provided in the portable terminal 500 is relatively smaller than the region where the hinge is provided in the general portable terminal 50. In other words, the region A2 of the hinge in the portable terminal 500 of FIG. 2B is smaller than the region A1 of the hinge in the general portable terminal 50 of FIG. 1B (A2<A1).

Figure 3:
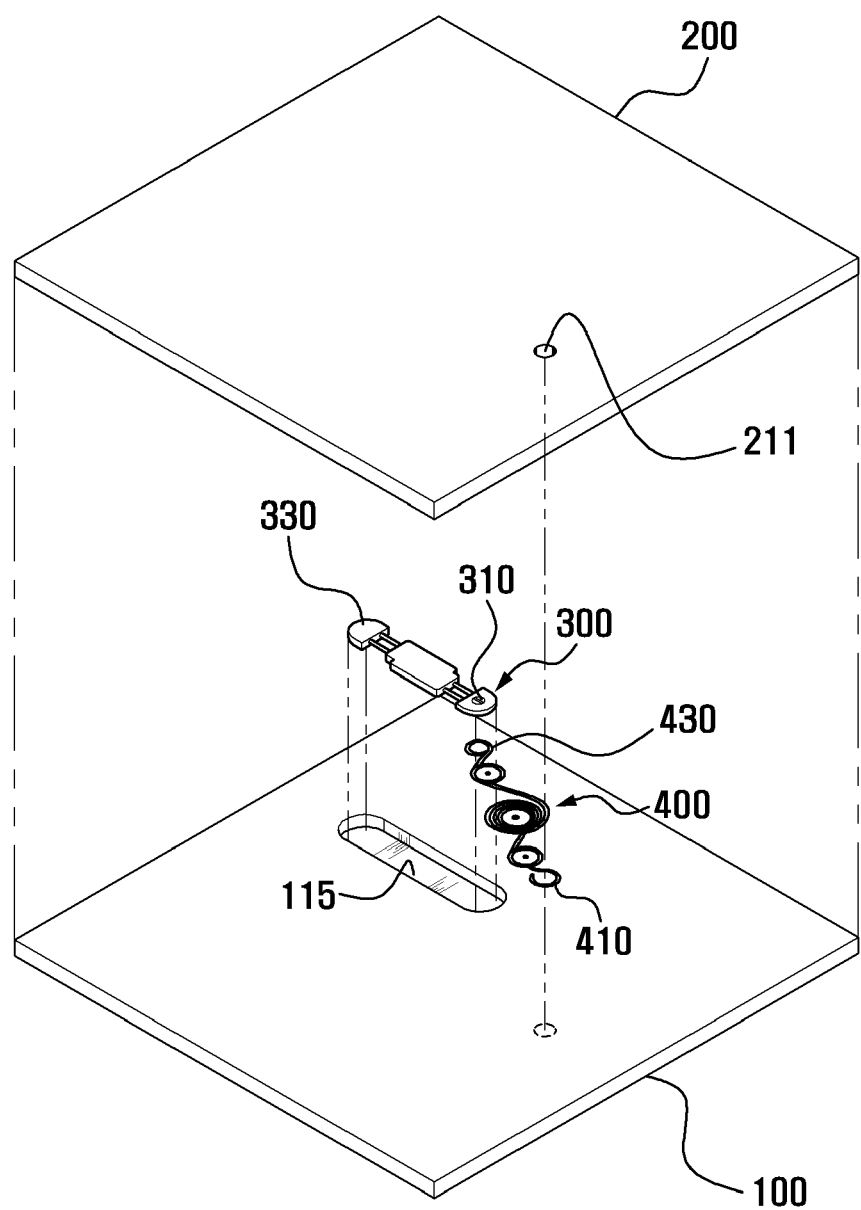
FIG. 3 is an exploded perspective view schematically showing coupling of the portable terminal with a long-stroke hinge according to the exemplary embodiment of the present invention.
Figure 4A:
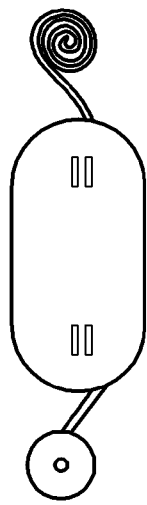
FIG. 4A, FIG. 4B, and FIG. 4C are schematic views showing a second spring of the long-stroke hinge.
Figure 4B:
Figure 4C:
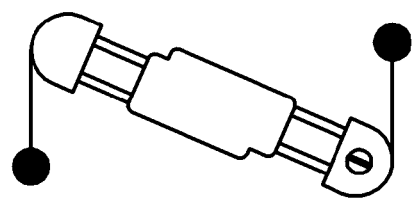
Figure 5:
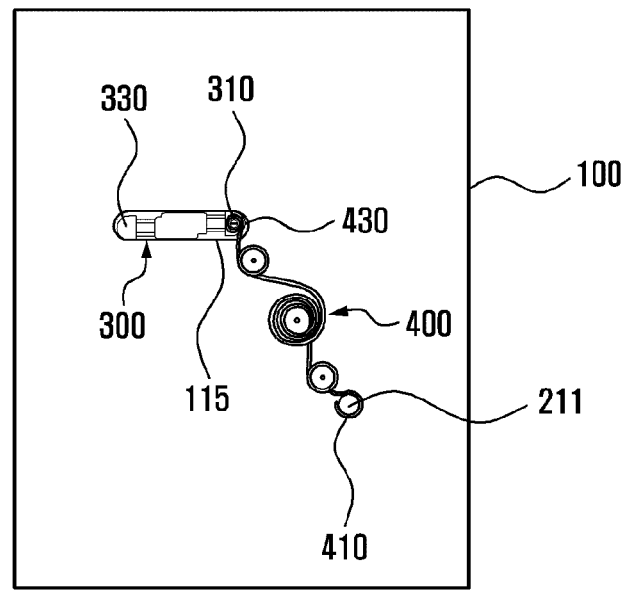
FIG. 5 is a sectional view showing a portion of the portable terminal to which the long-stroke hinge is coupled according to the exemplary embodiment of the present invention.

Hereinafter, the long-stroke hinge of the portable terminal according to the exemplary embodiment of the present invention will be described. FIG. 3 is an exploded perspective view schematically showing the coupling of the portable terminal with the long-stroke hinge according to the exemplary embodiment of the present invention. FIG. 4A, FIG. 4B, and FIG. 4C are schematic views showing a second spring of the long-stroke hinge. FIG. 5 is a sectional view showing a portion of the portable terminal to which the long-stroke hinge is coupled according to the exemplary embodiment of the present invention.

Referring to FIG. 2A, FIG. 2B, FIG. 3, and FIG. 5, the portable terminal 500 and the long-stroke hinges according to exemplary embodiments of the present invention will be described. An upper plate provided in the region A2 of the first main body 100 includes a first member, that is, a guide groove 115 into which a first spring 300 is inserted. A lower plate provided in the region A2 of the second main body 200 and facing the upper plate includes a second member of the upper plate, that is, a coupling portion 211 coupled with a movable piece 410 at an end of a second spring 400.

The first spring 300 may be a slidable spring horizontally extended and compressed along the guide groove 115 of the first main body 100. Although the first spring 300 is described as a push rod type slidable spring, the first spring 300 is not limited thereto. Any spring that may be extended and compressed may be used as the first spring 300. One end of the first spring 300 includes a fixed piece 330 that is coupled with the first main body 100, and the other end of the first spring 300 includes a movable piece 310 that horizontally moves along the guide groove 115 during the extension and compression of the first spring 300.

The second spring 400 is a compression spring that is rotatable, extendable, and compressable during the sliding of the second main body 200. Although the second spring 400 is described as a multi-torsion compression spring, the second spring 400 is not limited thereto. The second spring 400 may be a link type spring as shown in FIG. 4A, a torsion spring as shown in FIG. 4B, or a modified link type spring as shown in FIG. 4C. One end of the second spring 400 includes a fixed piece 430 coupled with the movable piece 310 of the first spring 300, and the other end of the second spring 400 includes a movable piece 410 coupled with the coupling portion 211 of the second main body 200 to move during the sliding of the second main body 200.

Referring to FIG. 3, the coupling between the long-stroke hinges and the portable terminal 500 will be described. The first spring 300 is inserted into the guide groove 115 formed in the upper plate of the first main body 100. When the fixed piece 430 is connected to the movable piece 310 and the movable piece 410 is connected to the coupling portion 211 of the lower plate of the second main body 200, the structure is established as shown in FIG. 5. In this case, the movable piece 310 of the first spring 300 and the fixed piece 430 of the second spring 400 are provided on the upper plate of the first main body 100.

The first spring 300 inserted into the guide groove 115 is fixed to the first main body 100 through the fixed piece 330 and extends and is compressed within the guide groove 115 during the sliding of the second main body 200. In other words, the movable piece 310 of the first spring 300 moves along the guide groove 115. The movable piece 410 of the second spring 400 moves up and down due to the sliding of the second main body 200 and due to this, the fixed piece 430 of the second spring 400, which is connected to the movable piece 310 of the first spring 300, moves along the guide groove 115. In other words, due to the rotation, extension, and compression of the second spring 400 caused by the movement of the movable piece 410 of the second spring 400, the fixed piece 430 of the second spring 400 moves along the guide groove 115.

Hereinafter, the sliding of the portable terminal having a long-stroke hinge according to the exemplary embodiment of the present invention will be described. FIG. 6A, FIG. 6B, FIG. 6C, and FIG. 6D are sectional views schematically showing the sliding of the portable terminal having a long-stroke hinge according to the exemplary embodiment of the present invention.

Figure 6A:
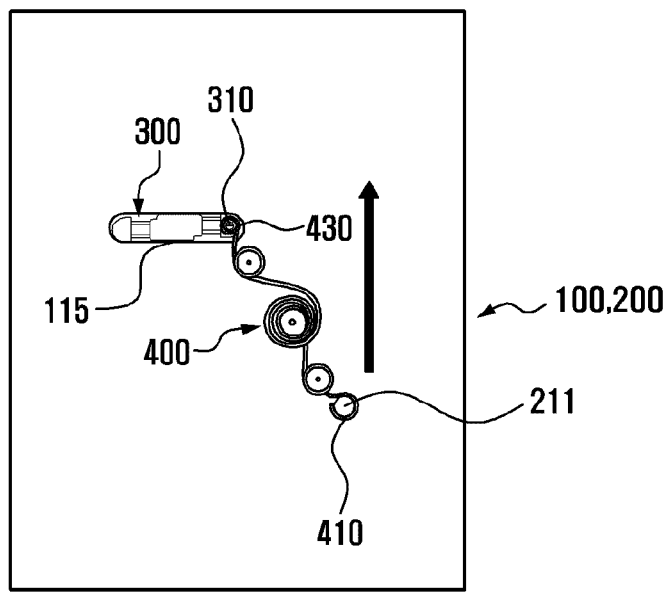
FIG. 6A, FIG. 6B, FIG. 6C, and FIG. 6D are sectional views schematically showing the sliding of the portable terminal having a long-stroke hinge according to the exemplary embodiment of the present invention.

FIG. 6A shows the closed state of the portable terminal 500 by the interaction between the first main body 100 and the second main body 200. The first spring 300 is not compressed and is inserted into the guide groove 115 of the first main body 100. The fixed piece 430 of the second spring 400 is coupled with the movable piece 310 of the first spring 300 in the guide groove 115 of the first main body 100 and the movable piece 410 is coupled with the coupling portion 211 of the second main body 200. The second spring 400 maintains a normal state (uncompressed state).

Figure 6B:
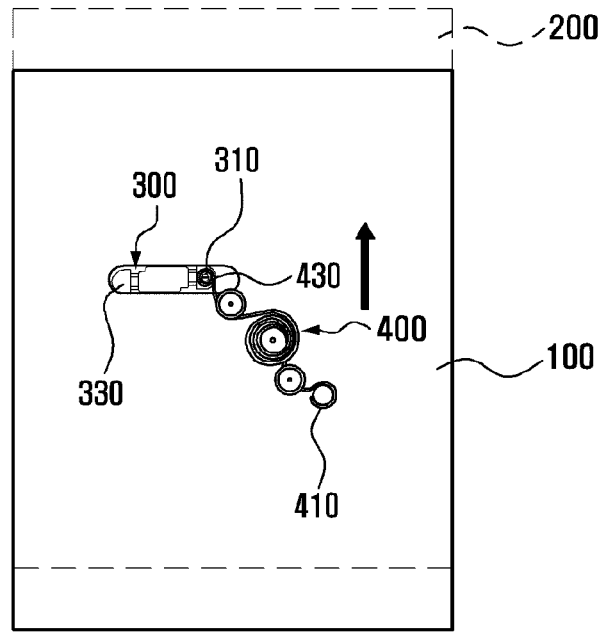

As shown in FIG. 6B, during the sliding of the second main body 200, the movable piece 410 of the second spring 400 coupled with the second main body 200 moves up due to the movement of the second main body 200. As a result, the first spring 300 is compressed along the guide groove 115 and the second spring 400 is also compressed. The movable piece 310 of the first spring 300 moves horizontally.

Figure 6C:
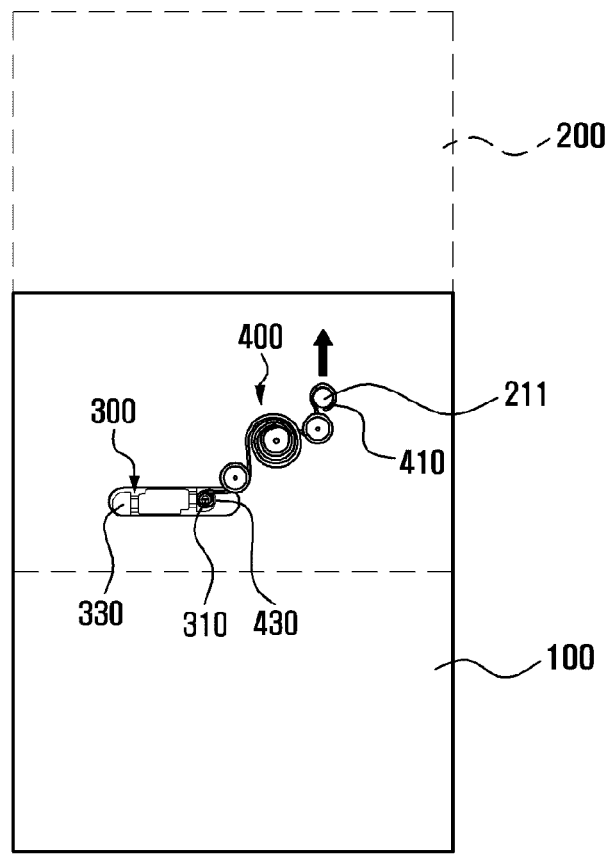

As shown in FIG. 6C, when the second main body 200 slidably moves, the first and second springs 300 and 400 reach a critical point of compression. As such, at the compression critical point where maximal stress is generated, a sufficient distance between the fixed piece 330 and the movable piece 310 is secured so that the lifespan of the first spring 300 may be prolonged. In other words, the first and second springs 300 and 400 are compressed as much as possible. Due to the compression force, the first spring 300 is extended and the second spring 400 rotates and extends. Due to this, the movable piece 410 of the second spring 400 moves up further. In other words, the second spring 400 rotates around the fixed piece 430 coupled with the first spring 300 and around the movable piece 410 coupled with the coupling portion 211 of the second main body 200 such that the movable piece 410 moves up. The first spring 300 is compressed along the guide groove 115 and the fixed piece 310 thereof moves horizontally.

Figure 6D:
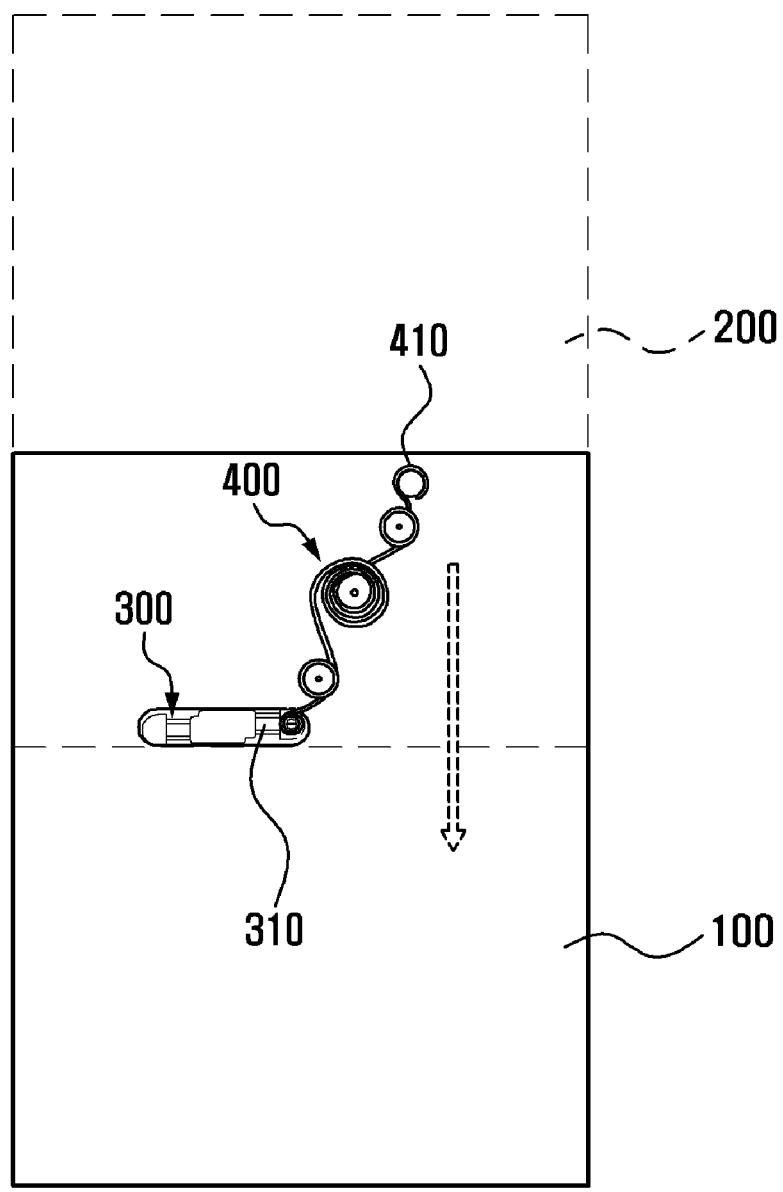

FIG. 6D shows that the second main body 200 slides and opens the portable terminal 500. The first spring 300 maintains a normal state in the guide groove 115. The second spring 400 is not compressed and the movable piece 410, differently from FIG. 6A, is located at an upper position.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A portable terminal, comprising:
   a first main body;
   a second main body slideably mounted on the first main body;
   a first member with elasticity, having a first end fixed to the first main body and a second end that is horizontally movable; and
   a second member with elasticity, having a first end rotatably coupled with the second end of the first member and a second end fixed to the second main body,
   wherein the second member is configured to be bent around three axes, such that when second member reaches a compression critical point, due to the relative movement of the second main body and the first main body, the first and second ends of the second member are disposed closer to the middle of the second member, as compared to when the second member is not compressed.

2. The portable terminal of claim 1, wherein the first member comprises a spring disposed entirely within a guide groove formed in the first main body, the spring being longitudinally extendable and compressible within the guide groove.

3. The portable terminal of claim 1, wherein the second member comprises a compression spring that is rotatable, extendable, and compressible during the movement of the second main body.

4. The portable terminal of claim 2, wherein the first member comprises a push rod.

5. The portable terminal of claim 3, wherein the second member comprises one of a link type member, a torsion type member, a multi-torsion type member, and a modified link type member.

6. A portable terminal, comprising:
   a first main body having a guide groove formed therein;
   a second main body contacting and sliding on the first main body, the second main body comprising a coupling portion;
   a first spring disposed entirely within the guide groove, having a first end that is fixed to the guide groove, and a second end that is horizontally movable within the guide groove; and
   a second spring having a first end rotatably coupled with the second end of the first spring and a second end fixed to the coupling portion of the second main body,
   wherein the second spring is configured to be bent around three axes, such that when second spring reaches a compression critical point, due to the relative movement of the second main body and the first main body, the first and second ends of the second spring are disposed closer to the middle of the second spring, as compared to when the second spring is not compressed.

7. The portable terminal of claim 6, wherein the first main body comprises a key input unit comprising number and letter keys and function keys.

8. The portable terminal of claim 7, wherein key input unit has a width of greater than 50 mm.

9. The portable terminal of claim 6, wherein the second main body further comprises a display, but does not comprise a key input unit.

10. The portable terminal of claim 6, wherein the first spring is a slidable spring that is horizontally extendable and compressible along the guide groove.

11. The portable terminal of claim 6, wherein the second spring is a compression spring that is rotatable, extendable, and compressible, when the second main body slides on the first main body.

12. The portable terminal of claim 6, wherein the second spring is a link type spring, a torsion spring, or a modified link type spring.

* * * * *